Feb. 29, 1944.  J. MELZER  2,342,680
CONVEYER
Filed March 19, 1941
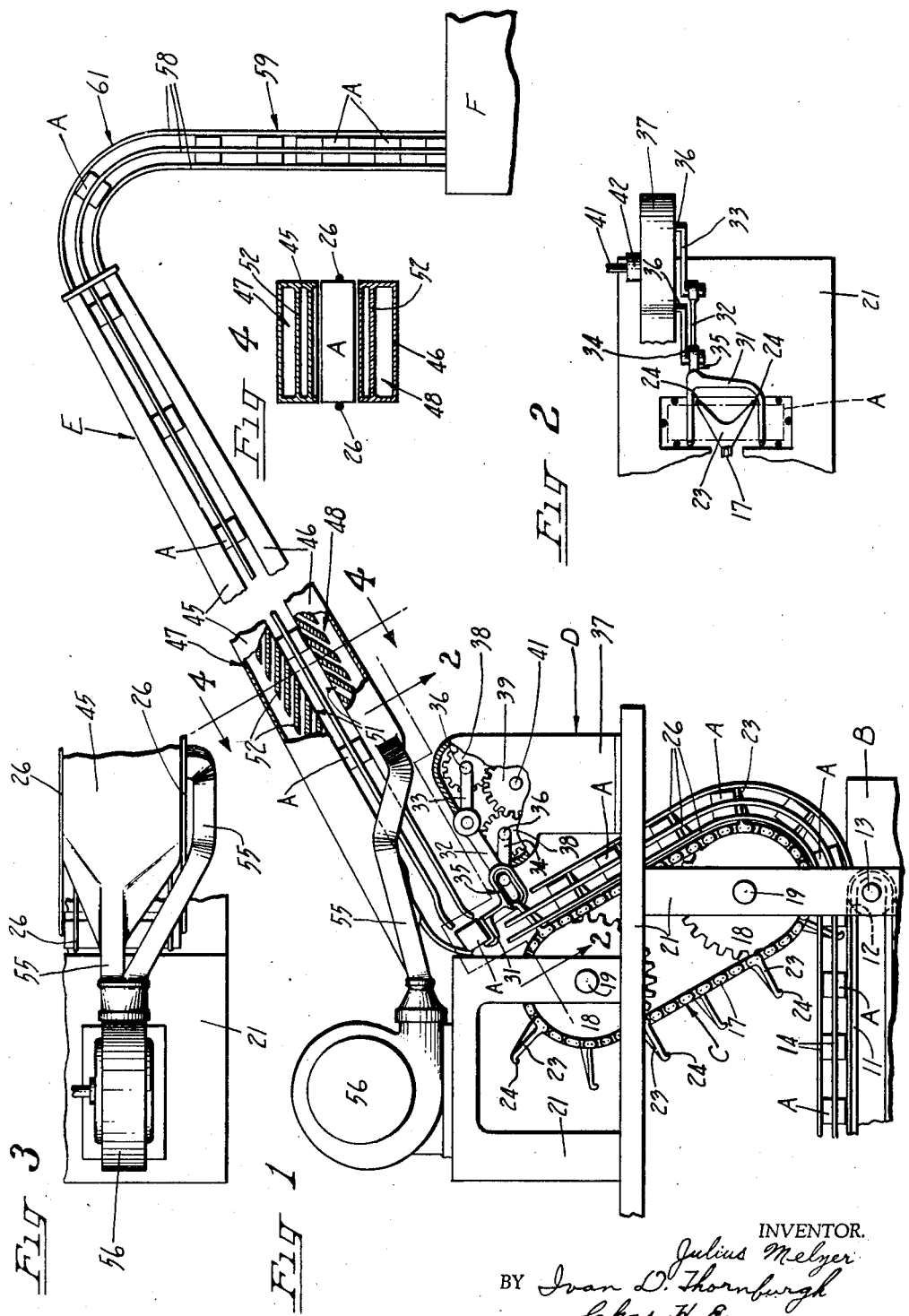

Patented Feb. 29, 1944

2,342,680

UNITED STATES PATENT OFFICE 2,342,680

CONVEYER

Julius Melzer, Bellaire, N. Y., assignor to American Can Company, New York, N. Y., a corporation of New Jersey Application March 19, 1941, Serial No. 384,200

4 Claims. (Cl. 198—20)

The present invention relates to conveyers for advancing light weight articles along a predetermined path of travel and has particular reference to a transfer device for transferring articles in a predetermined position from one conveyer to an angularly disposed continuing conveyer while maintaining the articles in the same relative position.

In the manufacture of light weight square fibre milk containers of the character disclosed in United States Patent 2,085,979, issued July 6, 1937, to John M. Hothersall, it is desirable to have the containers transferred from one machine to another in the line in a predetermined relative position. In the milk container mentioned above, for example, there is a dispensing opening in one corner of the container top and for best results it is sometimes necessary to feed the containers into machines operating on them, so that such dispensing opening will be properly located for the following operations.

The instant invention contemplates a conveyer having a transfer device for efficiently effecting such a transfer of these containers while maintaining them in the desired relative positions.

An object, therefore, of the invention is the provision in a conveyer system of a transfer device wherein articles are transferred from one conveyer to an angularly disposed conveyer while maintaining the articles in a predetermined position so that certain parts of the articles will be in proper location for subsequent handling or for a subsequent operation to be performed upon them.

Another object is the provision of such a transfer device wherein a variable speed is obtainable during each transfer cycle so that an article in a continuously moving procession of such articles may be rapidly picked up and removed from the procession without interfering with the other articles and transferred to another location at a slower and more gentle speed.

Numerous other objects and advantages of the invention will be apparent as it is better understood from the following description, which, taken in connection with the accompanying drawing discloses a preferred embodiment thereof.

Referring to the drawing:

Figure 1 is a side elevation of a conveyer system embodying the instant invention, with parts broken away and with other parts shown in section;

Fig. 2 is a sectional detail taken substantially along the line 2—2 in Fig. 1, with parts broken away;

Fig. 3 is a top plan view of the portion of the conveyer system shown at the left in Fig. 1, with parts broken away; and Fig. 4 is a transverse sectional detail taken substantially along the line 4—4 in Fig. 1.

As a preferred embodiment of the instant invention the drawing illustrates a conveyer system for handling square fibre milk containers A of the character disclosed in the above mentioned Hothersall patent.

In the process of manufacturing such containers they are transferred from one machine to another in the line by way of connecting runways or conveyers so that suitable operations may be performed on them in the proper sequence to progressively complete their fabrication. By way of example, the drawing discloses a portion of such a container manufacturing line in which the containers as they leave a machine B are picked up by a conveyer C and are carried upwardly away from the machine.

At a predetermined elevation the containers are transferred by a transfer device D from the conveyer C to an angularly disposed, continuing and inclined auxiliary conveyer E while they are maintained in a given position.

The conveyer E carries the containers to a still higher elevation from which they fall into a next following subsequent operation machine F. During all this travel of the containers they are positively guided and maintained in a predetermined position relative to parts of the containers themselves so that they will arrive in the subsequent operation machine in the proper position for the operation to be performed upon them.

In the machine B the containers are shown as being discharged preferably in spaced and timed order by an endless belt 11 which operates over a pulley 12 mounted on a shaft 13 journaled in suitable bearings formed in the machine frame. During their travel with the discharge belt the containers are guided by spaced and parallel side and top guide rails 14.

The pick-up conveyer C is located adjacent the discharge end of the machine B and extends upwardly preferably in a rearwardly inclined position. This conveyer includes an endless chain 17 which operates in a counterclockwise direction over a pair of spaced sprockets 18 mounted on rotatable shafts 19 journaled in suitable bearings formed in a structural steel auxiliary frame 21 which is bolted to the frame of the machine B. One of the sprockets may be a driving sprocket and this may be rotated in any suitable manner in time with the moving parts of the machine B.

At spaced intervals along the chain 17 there are provided Y-shaped fingers or flights 23 (see also Fig. 2) having pairs of spaced end hooks 24. As these flights travel under the lowermost sprocket 18 with the chain, they engage behind a container A on the discharge belt 11 and sweep it upwardly with the chain as it travels up along its upper run toward the top of the conveyer.

During this travel of the container it is retained in a predetermined position by spaced and parallel runway guide rails 26 which extend along the path of travel of the containers and which are preferably continuations of the guide rails 14. There are preferably six of these guide rails disposed adjacent the sides and the ends of the containers as best shown in Fig. 2, and they constitute a runway along which the containers advance.

Near the top of the pick-up conveyer C the runway guide rails 26 curve outwardly at right angles to the conveyer forming a curved runway section which merges into the auxiliary conveyer E. The transfer device D is located adjacent this curved section of the runway.

The transfer device D includes a movable bifurcated platform or transfer element 31 (Figs. 1 and 2) which is formed integrally with a long link 32. This link is connected by pivot pins to the outer ends of a pair of spaced and parallel crank arms, an outer long crank arm 33 and an inner short crank arm 34. The pivot pin of the short crank operates in a slot 35 formed in the link. The inner ends of the arms are formed integrally with rotatable shafts 36 carried in suitable bearings in a gear casing 37 supported on the auxiliary frame 21. Each shaft 36 carries a spur gear 38 located within the gear casing and these two gears mesh with a driving gear 39 mounted on a driving shaft 41 journaled in a bearing 42 formed in the gear casing. The shaft is driven in any suitable manner in time with the moving parts of the pick-up conveyer C.

Hence as the driving gear 39 rotates, it revolves the two gears 38 and their shafts 36 in a clockwise direction, as viewed in Fig. 1, and this swings the crank arms 33, 34 in a clockwise direction in a circle while maintaining them in parallelism. The rotating crank arms carry the link 32 around with them on an up-stroke and thence through a down-stroke. The difference in the length of the crank arms 33, 34 gives the transfer platform 31, on the up-stroke, a quickened oscillating movement.

The link 32 is located, in respect to the pick-up conveyer C and the auxiliary conveyer E, in such a manner that during the up-stroke portion of its rotation the transfer platform 31 sweeps through the conveyer C, the curved section of the runway guide rails 26 and a portion of the auxiliary conveyer E. This sweeping action of the transfer platform is effected in time with the passage of the containers through the pick-up conveyer C.

The timing of the transfer platform movement is such that when a container in the pick-up conveyer C reaches the curved section of the runway guide rails 26 at the top of the conveyer, the transfer platform sweeps rapidly from below into the path of travel of the container and picks it up from its flight 23. This rapid sweeping action is effected by the quickened oscillating movement above mentioned so that the platform will not interfere with the following containers in the pick-up conveyer. As the transfer platform continues to rapidly rise, it carries the picked-up container up through the curved section of the guide rails 26. As the transfer platform moves forward over the peak of its path of travel it slows down its movement and brings the container into a runway of the auxiliary conveyer E and on the down-stroke of the platform it moves away from the container leaving the latter in the auxiliary conveyer. The container is thus smoothly transferred from one conveyer to the other.

Since the transfer platform 31 is formed integrally with the link 32, the platform remains in a predetermined relative position while it travels through its cycle or endless orbit. Thus while the container is being transferred from one conveyer to the other it remains in a predetermined position in respect to any portion thereof. Hence the container is received in the auxiliary conveyer E in the same position occupied by the container in the pick-up conveyer C. Thus rotating of the container on its longitudinal axis is prevented during its transfer notwithstanding its passage around a curved section connecting the conveyers.

A container A received in the auxiliary conveyer E is preferably further advanced by air pressure. For this purpose the conveyer E includes an upper longitudinal guide housing 45 and a lower longitudinal guide housing 46 which enclose air chambers 47, 48, respectively. These housings constitute air ducts through which compressed air is forced.

The housings 45, 46 preferably taper from an enlarged section located at the container entrance end of the conveyer to a reduced or smaller section at the discharge end of the conveyer. The inner or adjacent walls of the housings are parallel and are spaced apart for the passage of the containers between them while the outer runway guide rails 26 connect with the housings to guide the containers into place. The end guide rails 26 continue parallel with the said housings to complete the runway and to limit the endwise shifting of the containers (see also Fig. 4). These inner walls are formed with a plurality of transverse slots 51 which are located adjacent transverse inclined vanes 52 secured in the ducts.

The enlarged ends of the ducts 45, 46 are connected by conduits 55 (see also Fig. 3) to a rotary or fan blower 56 which is supported on the auxiliary frame 21. This blower constitutes the source of compressed air and is operated in any suitable manner.

Hence air from the blower 56 is blown into the ducts or housings 45, 46 and is directed by the inclined vanes 52 into and through the transverse slots 51. The air thus partially compressed issues from the slots with considerable force and impinges against a container transferred into this auxiliary conveyer and thereby propels or advances the container in a forward direction. As the container advances the air from the advanced slots impinges against it and thus maintains it in motion until it reaches the discharge end of the conveyer.

At the discharge end of the conveyer E a plurality of guide rails 58 connect with the conveyer to provide a continuing runway 59. These guide rails preferably bend around a curved section 61 of the runway and thence extend downwardly into the next operation machine F.

Hence when a container is discharged from the auxiliary conveyer E it continues its travel into the runway 59 and thus falls in proper and predetermined position into the machine F for the next following operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveyer system, a movable transfer platform, a link formed on said platform, a pair of spaced and parallel crank arms on which said platform link is pivotally mounted, one of said crank arms having a shorter length than the other and having a sliding connection with said platform link, and actuating means for rotating said crank arms in unison to propel said transfer platform through a curved path of travel, said crank arms giving said transfer platform a variable speed so that the latter will rapidly sweep through a portion of its path of travel to pick up an article from one location and transfer it to another location at a slower speed while maintaining said platform in substantial parallelism so that the article remains in a constant relative position during its transfer.

2. In a conveyer system, a main runway for articles moving therealong, an auxiliary runway adjacent said main runway, a movable transfer platform located adjacent said runways, a link formed on said platform, a pair of spaced and parallel crank arms on which said platform link is pivotally mounted, one of said crank arms having a shorter length than the other and having a sliding connection with said platform link, and actuating means for rotating said crank arms in unison to propel said transfer platform through a curved path of travel, said crank arms giving said transfer platform a variable speed so that the latter will rapidly sweep through said main runway to pick up an article and transfer it to the auxiliary runway so that the article which has been delivered into said auxiliary runway is in the same relative position as it occupied when leaving said main runway.

3. In a conveyer system having an endless conveyer provided with spaced flights for carrying articles, a pneumatic conveyer disposed at an angle to said endless conveyer and having pneumatic means for advancing articles therealong, and an article transfer device disposed between adjacent ends of said angularly disposed conveyers for transferring articles from one conveyer to the other; the improvement comprising a pair of crank arms of different lengths respectively secured to opposite ends of said transfer device, the difference in length of said crank arms serving to move said transfer device in an endless path of travel at a varying speed including an initial accelerated speed, whereby to insure against interference of said transfer device with articles moving along a said conveyer to be transferred to the other of said conveyers.

4. In a conveyer system, a main runway for articles moving therealong, an auxiliary runway disposed at an angle to said main runway and connected therewith by a curved section, a transfer device located adjacent said curved section of the runways, said transfer device including a movable platform for sweeping through both runways including said curved section for transferring an article from the main runway around said curved section and into the angularly disposed auxiliary runway in the same relative position, said platform having a pair of crank arms of different lengths respectively secured to opposite ends thereof to maintain said platform in a constant plane, the different lengths of the crank arms serving to accelerate the platform in one direction of movement to rapidly engage and transfer an article from one conveyer runway to the other, to insure against interference of said transfer device with articles moving along said main runway.

JULIUS MELZER.